United States Patent
Posehn

(10) Patent No.: US 8,515,270 B1
(45) Date of Patent: Aug. 20, 2013

(54) SYSTEM AND METHOD FOR IMPROVED TIME-LAPSE PHOTOGRAPHY

(75) Inventor: Michael R. Posehn, Penryn, CA (US)

(73) Assignee: Granite Bay Software, Penryn, CA (US)

( * ) Notice: Subject to any disclaimer, the term of this patent is extended or adjusted under 35 U.S.C. 154(b) by 0 days.

(21) Appl. No.: 13/566,665

(22) Filed: Aug. 3, 2012

(51) Int. Cl.
*G03B 17/00* (2006.01)

(52) U.S. Cl.
USPC ......................................................... 396/48

(58) Field of Classification Search
USPC ......................................................... 396/48
See application file for complete search history.

(56) References Cited

U.S. PATENT DOCUMENTS

| | | | | |
|---|---|---|---|---|
| 4,300,825 A | * | 11/1981 | Kitaura et al. | 396/161 |
| 6,831,689 B2 | * | 12/2004 | Yadid-Pecht | 348/297 |
| 6,985,185 B1 | * | 1/2006 | Crawford et al. | 348/362 |
| 7,463,296 B2 | * | 12/2008 | Sun et al. | 348/254 |
| 2006/0044394 A1 | * | 3/2006 | Read | 348/207.1 |

* cited by examiner

*Primary Examiner* — Rodney Fuller
(74) *Attorney, Agent, or Firm* — Temmerman Law Office; Mathew J. Temmerman

(57) ABSTRACT

A method for generating a series of time-lapse photographs exhibiting minimal flicker is presented. The preferred method is adaptable to capture a series of time-lapse photographs of a sunset from full daylight to darkest night or vice versa while minimizing flicker between the images. The method utilizes a software program designed to achieve an even transition of the time-lapse and to minimize flickering of an image sequence. The software program features a flicker minimizing function designed to control several factors affecting the time-lapse technology. The present method utilizes data regarding a time-of-day a time zone at a geographic location. Latitude and longitude coordinates are utilized to automatically adjust the rate of change of exposure in a period of twilight. The software program is executed with a time-lapse interval between a plurality of images.

24 Claims, 8 Drawing Sheets

SYSTEM AND METHOD FOR IMPROVED TIME-LAPSE PHOTOGRAPHY

BACKGROUND OF THE INVENTION

1. Technical Field of the Invention

The present invention relates in general to time-lapse photography. More specifically, the present invention provides a method for capturing a series of time-lapse photographs with minimal flicker.

2. Description of the Related Art

Time-lapse photography is a technique for capturing a series of photographs over time. In its most dramatic form, a series of images is captured and some slow change occurring in time over the series of images and that may not be otherwise perceptible becomes apparent when time is compressed due to the time-lapse. In its most basic form, time-lapse technology enables a photographer to use his or her camera to capture a series of photographs or film frames at specific intervals of time. Common uses of this technology involve the capturing of videos of the sunset, the motion of stars and clouds in the sky, the blossoming of a bud into a flower, the melting of an ice cube, or the construction of a building, to name a few. Generally, the optimal subject matter of the photos is one exhibiting very slow changes over time; however, in practice any subject may be used. Time-lapse technology and techniques may be used with either a digital camera or in an analog camera, where often either type is controlled and/or adjusted by an external computing device. In other cases, onboard technology may control the time-lapse, such as the "TimeLapse" app by xyster.net, which allows a conventional iPad with camera to essentially become a time-lapse photography generating system. In all cases, after capturing all the desired images, each of the image frames is sequenced with a plurality of others and at a particular frame rate per second so that to the observer the collection of still images appears in sequence to show time moving at a rate much faster than it does in nature.

Because of the way all cameras must handle varying levels of light, time-lapse photography works best when lighting conditions are nearly static throughout the time-lapse. For instance, a flower blooming in a lit room, or in the middle of the bright sunshine over the course of several hours make exemplary subject matter because the only exhibiting great change over the time-lapse is the flower. One well-known problem of the time-lapse technique that can occur when lighting conditions are not static is flickering, or the opposing changes in light luminosity between frames of a time-lapse. Light conditions greatly affect the brightness of the time-lapse photographs, and thus if conditions are changing, such as when clouds occasionally obscure the sun, or the setting or rising of the sun occurs during the time-lapse, then the final motion picture may appear to flicker. This is because what may only be subtle brightness variation between a first image and a second image may actually be processed by the camera in widely varying ways.

A modern camera normally automatically adjusts its image capture settings and parameters to account for the huge variations in the amount of light in the framed image captured by the camera. However, modern cameras also only have a finite number of settings and generally don't allow for the high precision adjustments that would be needed for two very similar images to be processed in a way such that the total brightness of each frame is nearly identical. When a series of time-lapse photographs are taken of an environment with a changing light source by a camera without such precision, flickering may be apparent in the finished animation. That is, the improper or imprecise adjustment of the camera aperture and other settings bring about different brightness levels in different frames of the video. This causes slightly too much or slightly not enough light to enter into the camera, ultimately resulting in flickering of an image sequence in the video.

The above-described problems are most apparent when a time-lapse captures the progression of an environment from either day to night, or night to day. It is known that in an environment of a typical bright day and the environment of a typical a starry night have a light difference of about twenty-one stops, where a stop is a relative measurement of light, typically measured with an f-number (or f-stop), which is the ratio of the lens's focal length to the diameter of the entrance pupil. In order to minimize flickering during time-lapse photography when the light levels are dramatically changing, the camera exposure settings must be changed very gradually over a range greater or equal to twenty-one stops. If done with absolute precision, no flickering would be apparent because the brightness of the image would be identical from frame to frame. However, typical camera exposure settings such as camera aperture and shutter speed cannot be changed gradually or with sufficient precision because the presets are normally spaced at ⅓-stop intervals, even on professional cameras. Thus, changing these settings at even their smallest increments (⅓ stop) causes abrupt brightness changes and the final time-lapse image will exhibit unwanted flicker.

Although the problem occurs whenever light conditions are changing, as may be expected the problem is most apparent during the transition from day to night or night to day, and more particularly during the twilight hours. It just so happens that these times are some of the most popular and dramatic times photographers choose to take a time-lapse animation in the first place. Further, the rapidity of changes during the twilight hours is dependent on the latitude of the viewer. To overcome this problem, the rate of change of the camera exposure settings in the twilight period must be adjusted to account for those changes.

Conventional methods for solving the above-mentioned problems in time-lapse photography involve the post-processing of images wherein by using software the various levels of light from frame to frame are slightly adjusted so that any flickering is reduced. If, for instance, one frame is particularly darker than those around it, the light level of that particular frame may be increased. This method adds a layer of complexity and time to the system that the present invention does away with.

Hence, it can be seen that there is a need for an improved method of generating a series of time-lapse photographs that exhibit minimal flicker, even when light levels are changing. Further, such a method would compensate for the massive difference in amount of light between day and night and allow for the capturing of a time-lapse sunset from full daylight to darkest night or a time-lapse sunrise from darkest night to full daylight. In addition, this improved method would also properly adjust the rate of change of camera exposure settings during the twilight period based on both light levels and the latitude of the system.

SUMMARY OF THE INVENTION

To minimize the limitations found in the prior art and to minimize other limitations that will be apparent after review of this specification, the present invention provides a method for generating a series of time-lapse photographs for use in a time-lapse process wherein flicker between the photographs is minimized. In the preferred embodiment the method utilizes a software program that features a flicker minimizing function that controls several factors of the time-lapse process. As an initial step of the method, time-of-day at a geographic location is entered either manually or automatically into an electronic device on which the software program is running. The electronic device may be the camera itself or may be a device connected to the camera and which controls the camera. Latitude and longitude data are entered either manually or automatically into the flicker minimizing function defined in the software program. One method of obtaining the latitude and longitude data is obtain the information from a plurality of global positioning system ("GPS") coordinates. After the latitude and longitude coordinates are entered, aperture value (Av) information is entered either manually or automatically into the software program so the software program may determine whether to hold an Av constant or to allow the software program to change the Av.

An Av lens minimum f-number value, an Av lens maximum f-number value and an Av shift time are entered into the electronic device, as are a camera sensitivity minimum value, a camera sensitivity maximum value and a camera sensitivity shift time. These parameters like the others may be entered either manually or automatically. Thereafter, a minimum shutter speed (Tv) value and a maximum shutter speed value are entered. At least one neutral density filter (ND) having a stop value is installed on a camera lens. A desired image luminance value is entered into the software program either manually or automatically. Next, an initial shutter speed, an initial camera sensitivity value and an initial shutter speed value are provided to establish an initial image luminance near the desired image luminance value. The software program then directs the camera to capture a plurality or series of images having a time-lapse interval therebetween. As a brief exemplary case, if the time-lapse is being captured during a sunset when light levels are slowly dropping between each photograph captured, the software controls the shutter speed of the camera such that the shutter speed is gradually increased to maintain the desired luminance during a sunset. However, as seen in the limitations of the prior art, control over shutter speed of modern cameras alone is generally not enough to completely eliminate flicker. In order to further maintain minimize or eliminate flicker, after a first adjustment of the shutter speed, the Av is incrementally decreased when the shutter speed increases beyond the Av shift time and the camera sensitivity is incrementally increased when the shutter speed increases beyond the camera sensitivity shift time.

A corresponding reciprocal change is made in the shutter speed value by the flicker minimizing function whenever the aperture value or the camera sensitivity changes incrementally. Later in the method, and as will be explained in further detail in the detailed description portion of this application, at least one neutral density filter may be removed by a camera operator each time the shutter speed increases sufficiently to allow the software program to reduce the shutter speed reciprocally and so as to maintain a value greater than the minimum bulb time of the camera. Thereafter, the software program may automatically and gradually increase the shutter speed when the camera sensitivity has not attained a maximum value.

The camera sensitivity is incrementally increased whenever the shutter speed increases beyond the camera sensitivity shift time. Then, the software program makes a corresponding reciprocal change in the shutter speed value whenever the camera sensitivity is incrementally changed. The shutter speed is automatically and gradually increased by the software program up to a maximum value specified by the camera operator or automatically determined by the program. The software program optionally utilizes the plurality of latitude and longitude coordinates to further automatically adjust the rate of change of exposure in a period of twilight and tailors the time-lapse to a plurality of conditions at the specific latitude value of the camera or time-lapse subject being photographed. The software program automatically calculates the period of twilight brightness and adjusts for the correct rate of brightness change. The software program computes a sun angle from the local time and the plurality of latitude and longitude coordinates to ensure accuracy regardless of the latitude. Thus, the latitude and longitude information is always useful for achieving a minimal flicker time-lapse, not just in the twilight scenes. The flicker minimizing function calculates a total exposure value ("TEV") for setting new values for the shutter speed, the sensitivity and the Av to capture a new image. The TEV denotes all combinations of the aperture, shutter speed, sensitivity and the ND filter.

It is thus a first objective of the present invention to provide a method for capturing a flicker-minimized series of time-lapse photographs of a sunset from full daylight to darkest night or vice versa.

A second objective of the invention is to provide a method that utilizes a software program, designed to achieve an even transition among photographs during a time-lapse even when environmental light levels are variable among said photographs.

It is a third objective of the invention is to provide a method of using a software program that is designed to use the most precise and optimal camera shutter settings possible.

A fourth objective of the invention is to provide a method that utilizes latitude and longitude coordinates to automatically adjust the rate of change of exposure in a period of twilight and tailor the time-lapse to a plurality of conditions at the specific latitude value at which the time-lapse is captured.

A fifth objective of the invention is to provide a method that automatically calculates a period of twilight brightness and adjusts for the correct rate of brightness change.

A sixth objective of the invention is to provide a method for generating a series of photographs used for time-lapse photography, wherein the total exposure value is calculated for each of said photographs.

These advantages and features of the invention are described with specificity to make it understandable to one of ordinary skill in the art.

BRIEF DESCRIPTION OF THE DRAWINGS

In order to enhance their clarity and improve understanding of these various elements and embodiments of the invention, elements in the figures have not necessarily been drawn to scale. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that may each be used independently of one another or in combination with other features. However, any single inventive feature may not address each or any of the problems discussed above or may only address one of the problems discussed above. Further, one or more of the problems discussed above may not be fully addressed by any of the features described below.

Figure 1A:
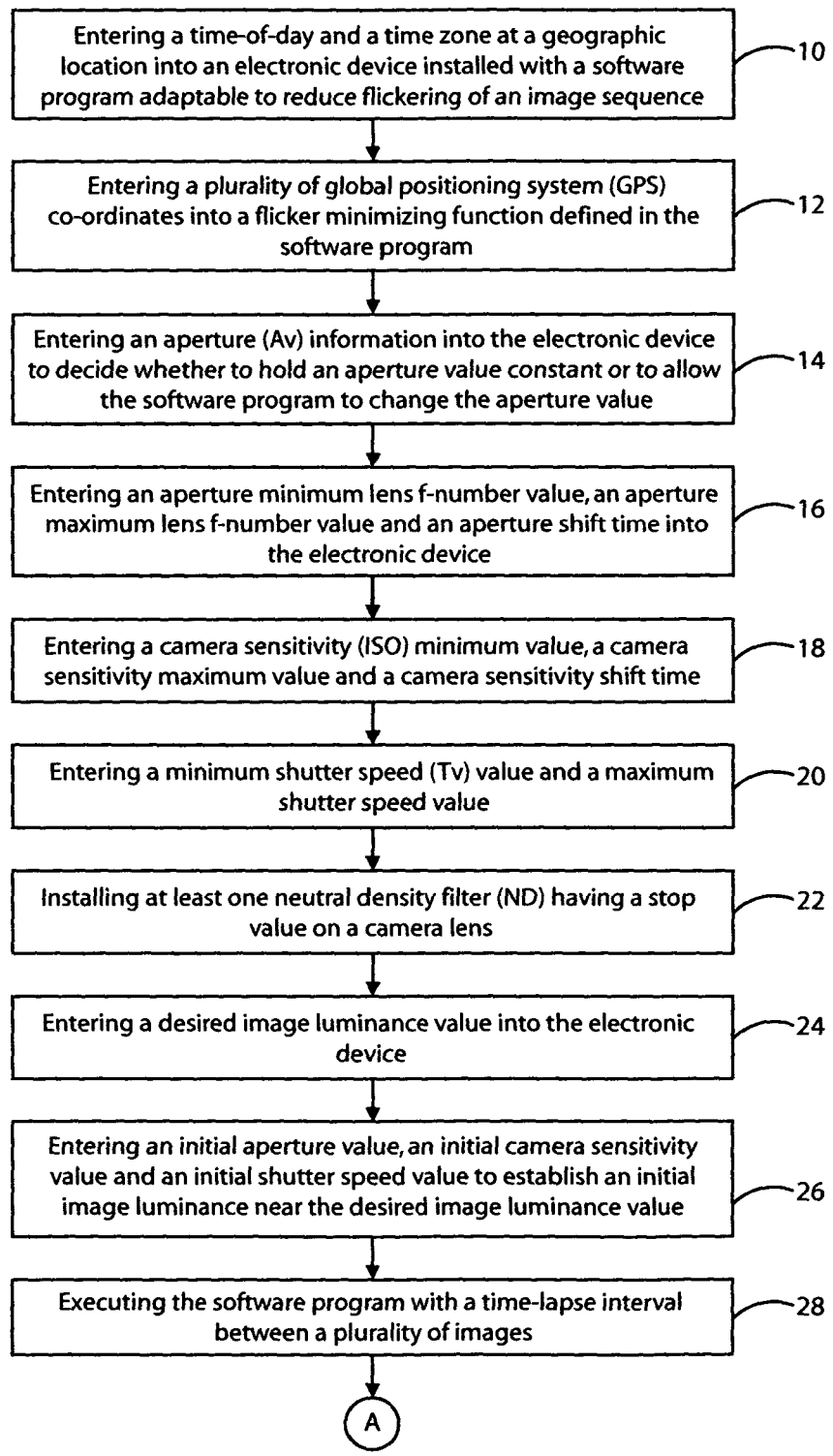
FIG. 1A is a partial flowchart illustrating a method of the present invention for generating a time-lapse series of photographs exhibiting minimal flicker.
Figure 1B:
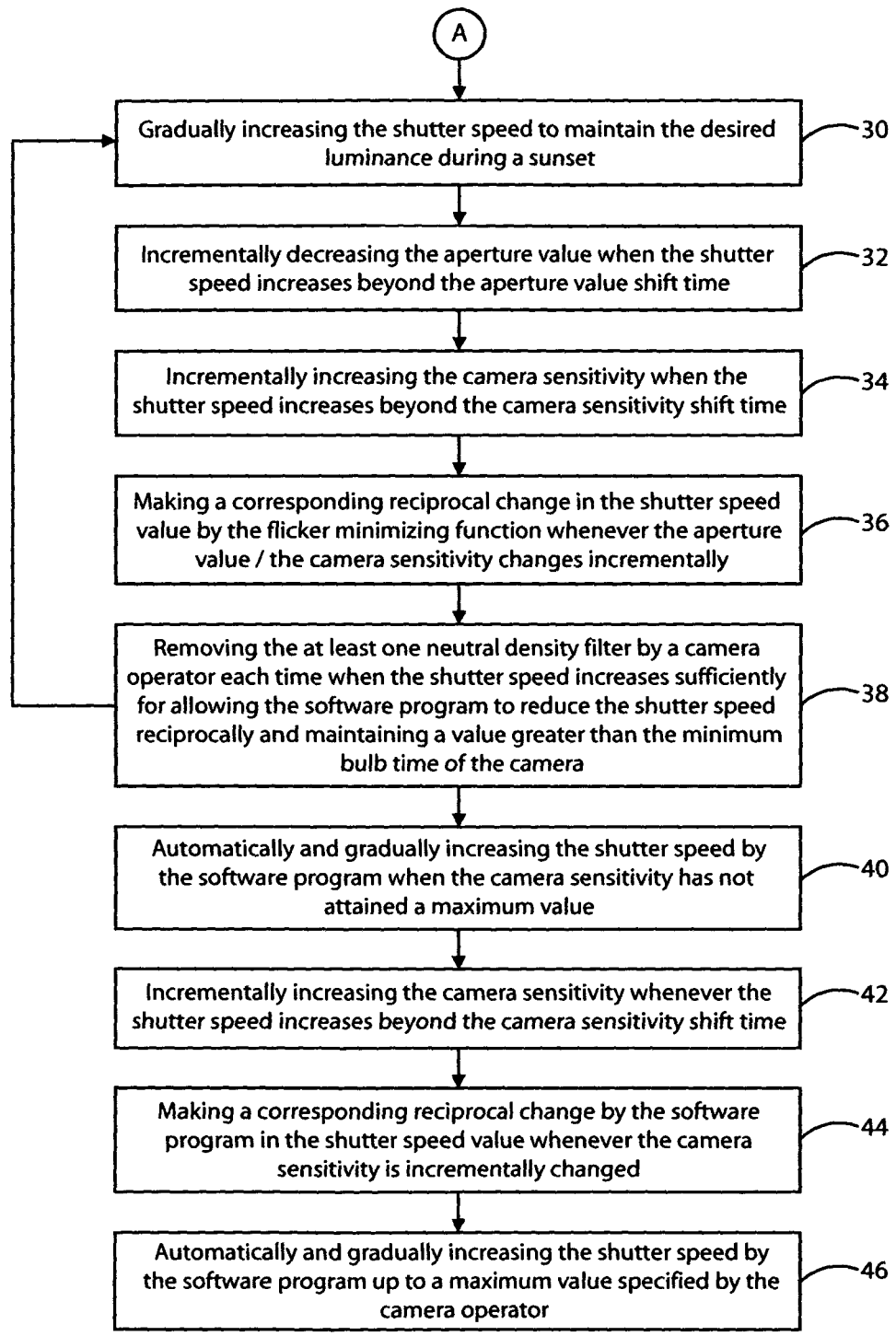
FIG. 1B is a partial flowchart illustrating a method of the present invention for generating a time-lapse series of photographs exhibiting minimal flicker.

FIG. 1 is a flowchart illustrating a method for generating a series of time-lapse photographs exhibiting minimal flicker. This method will allow the capture of a series of flicker-minimized time-lapse photographs of an environment having a widely changing light source. The software program features a flicker minimizing function designed to control several factors affecting the time-lapse technology. Brightness of the sky depends on cloud cover, horizon obstructions (terrain and buildings), position and phase of the moon and artificial lighting. In the preferred embodiment, the software program automatically compensates for these large-scale brightness effects and at the same time provides an option for the user to choose a sensitivity level implemented therein to handle some of the factors for brightness change, like cloud cover. By adjusting the sensitivity level, the software program can be made more or less sensitive to these smaller, more momentary changes in brightness.

The software program uses the most precise and optimal camera shutter settings possible. In order to allow a camera to capture the full range of normal environmental light conditions, the camera must handle a difference of the equivalent of twenty-one stops—that is, if only bulb time were used the bulb would transition from 0.2 second in brightest day to 209715 seconds at darkest night. This difference is nearly one million fold and normally requires the addition and removal of neutral density filters to best capture the transition. For instance, during a sunset, one must remove the neutral density (ND) filter(s) and increase the camera sensitivity (ISO) in order to keep the bulb time to a practical value (typically less than one minute). It is known that the addition of one ND2.7 (512×) filter reduces the amount of light by nine stops from (f/16, ISO 100, 1/100) to (f/4, ISO 100 and 0.32 seconds).

In the preferred embodiment, the method for generating the flicker-minimized time-lapse photograph starts by entering a time-of-day and a time-zone at a geographic location into an electronic device installed with the software program as shown in block 10. This and all information here may be entered either manually or automatically. Latitude and longitude coordinates may be entered into the flicker minimizing function defined in the software program as indicated at block 12. The latitude and longitude values may be derived from GPS coordinates. After entering the latitude and longitude, aperture (Av) information is entered into the software program so the program may determine whether to hold an Av as constant or to allow the software program to change the Av as shown in block 14.

Referring to block 16, an aperture minimum lens f-number value, an aperture maximum lens f-number value and an aperture shift time are entered either manually or automatically into the electronic device. The aperture shift time is a shutter speed value above which the flicker minimizing function reduces the aperture f-number. The f-number refers to focal ratio/f-stop/relative aperture that controls the size of a circular opening in a camera, which allows the light to enter into a camera lens. As indicated at block 18, a camera sensitivity (ISO) minimum value, a camera sensitivity maximum value and a camera sensitivity shift time are entered in the flicker minimizing function, wherein camera sensitivity is the measure of the camera's sensitivity to light, determined by sensitometry or digital signal gain and measured on various numerical scales, including among others, ISO. The camera sensitivity shift time is a shutter speed value above which the flicker minimizing function increases the camera sensitivity. Thereafter, a minimum shutter speed (Tv) value and a maximum shutter speed value are entered as depicted in the block 20. The minimum shutter speed value is longer than a minimum bulb time of a camera and the maximum shutter speed value is short enough to allow for a practical time-lapse interval. The bulb time is controlled electronically with a command sent to open the camera shutter followed by a command to close the camera shutter. In a bulb mode, the shutter speed is changed in increments as small as 0.001 seconds. A small change in the shutter speed produces a small change in brightness that is sufficient to minimize the flicker in the images to the extent that it is no longer apparent. The minimum bulb time of the camera is preferably greater than 0.1 seconds and for practical purposes the bulb time upper limit is 2 minutes or less. In a less preferred embodiment, the minimum bulb time may be greater than 0.2 seconds and the time-lapse interval is less than 30 seconds.

Referring to block 22, at least one neutral density filter (ND) having a stop value is installed on a camera lens. A desired image luminance value is entered either manually or automatically into the software program as shown in block 24. The desired image luminance value is a measurement of the apparent brightness of the image. Then, an initial Av, an initial camera sensitivity value and an initial shutter speed value are provided to establish an initial image luminance near the desired image luminance value as indicated at block 26. The software program is executed with a time-lapse interval between a plurality of images as shown in block 28. Upon executing the software program, the shutter speed is gradually increased to maintain the desired luminance during a sunset as depicted in block 30. Next, the Av is incrementally decreased when the shutter speed increases beyond the Av shift time as shown in block 32 and the camera sensitivity is incrementally increased when the shutter speed increases beyond the camera sensitivity shift time as indicated at block 34.

Referring to block 36, a corresponding reciprocal change is made in the shutter speed value by the flicker minimizing function whenever the Av or the camera sensitivity is modified. As necessary, one neutral density filter is removed by a camera operator each time the shutter speed increases sufficiently to allow the software program to reciprocally decrease the shutter speed and maintain a value greater than the minimum bulb time of the camera as shown in block 38. The process control flows to block 30 and steps up to the block 38 until at least one neutral density filter has been removed. Thereafter, the software program automatically and gradually increases the shutter speed when the camera sensitivity has not attained a maximum value as shown in block 40.

As shown in block 42, the camera sensitivity is incrementally increased whenever the shutter speed increases beyond the camera sensitivity shift time. Then, a corresponding reciprocal change by the software program in the shutter speed value is made whenever the camera sensitivity is incrementally changed as depicted in block 44. The shutter speed is automatically and gradually increased by the software program up to a maximum value specified by the camera operator as shown in block 46.

The aforementioned method is repeated until the settings of the flicker minimizing function terminate. The electronic device may be selected from a group consisting of: a camera, a computer such as a desktop, laptop, or tablet, and a mobile phone. The flicker minimizing function calculates a total exposure value (TEV) for setting new values for the shutter speed, the sensitivity and the aperture for the capture of a new image. The TEV is the sum of the exposure values of the aperture (Av), the shutter speed (Tv), the sensitivity (ISO) and the ND filter. The preferred method can be customized to generate a time-lapse photograph of a sunrise from night to day or a sunset from day to night.

Figure 2:
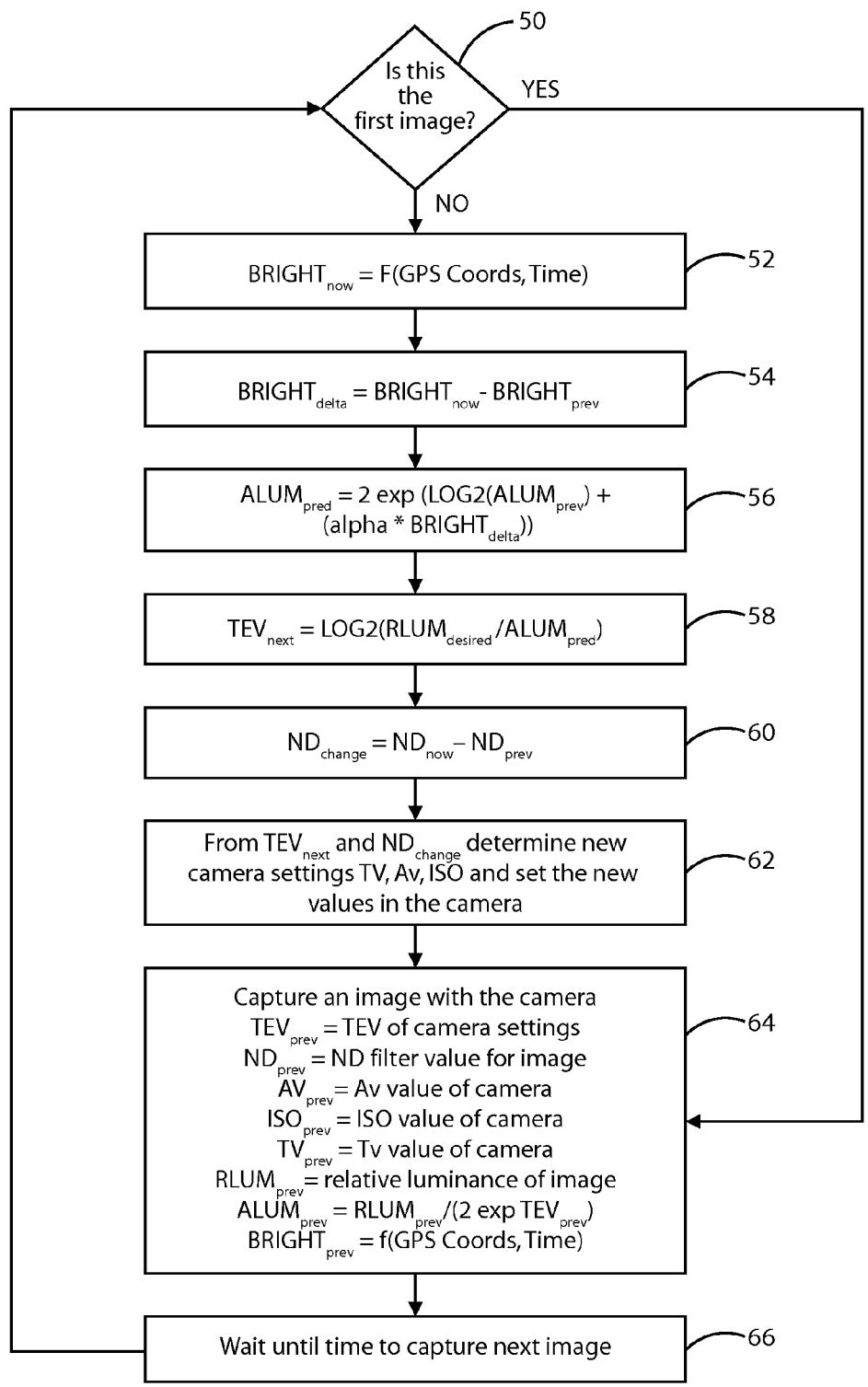
FIG. 2 is a flowchart illustrating a method for calculating the total exposure value (TEV) of a camera by setting new values for the shutter speed, sensitivity and aperture to capture a new image by the flicker minimizing function of the present invention.

Referring next to FIG. 2, a method for calculating the TEV is illustrated. The TEV calculation method is accomplished by performing a check to verify whether the camera is capturing a first image as shown in block 50. If the camera is not capturing the first image, then a current brightness ($BRIGHT_{now}$) is calculated based on the latitude and longitude coordinates and the time-of-day as shown in block 52. The $BRIGHT_{now}$ is a relative brightness of the sky on a logarithmic base 2 scale. A larger value for $BRIGHT_{now}$ causes a bright effect. Next, a predicted change in brightness ($BRIGHT_{delta}$) is calculated by subtracting a previous brightness ($BRIGHT_{prev}$) from the $BRIGHT_{now}$ as indicated at block 54. A predicted absolute luminance ($ALUM_{pred}$) is calculated by utilizing a previous absolute luminance ($ALUM_{prev}$) and the $BRIGHT_{delta}$ as shown in block 56. The $ALUM_{prev}$ is calculated from an equation $ALUM_{pred}=2 \exp (LOG\ 2(ALUM_{prev})+(alpha*BRIGHT_{delta}))$. Here, LOG 2 means logarithm to the base 2 and alpha is a coefficient, nominally 1.0.

After that, a $TEV_{next}$ is calculated for the next image exposure by utilizing a relative luminance desired by the camera operator ($RLUM_{desired}$) and the $ALUM_{pred}$ as shown in block 58. The $TEV_{next}$ is calculated from an equation $TEV_{next}=LOG\ 2(RLUM_{desired}/ALUM_{pred})$. The RLUM is the relative luminance of an image. It is the mean value of an image histogram. The ALUM is the absolute luminance of an image and is calculated by dividing RLUM by 2 to the TEV power. Then, a change in ND filter value ($ND_{change}$) is calculated by subtracting the previous ND value ($ND_{prev}$) from the current ND value ($ND_{now}$) as indicated at block 60. Finally, as shown in block 62, new values for the shutter speed, the sensitivity and the aperture are determined utilizing the $TEV_{next}$ and the $ND_{change}$ and the calculated new values are set in the camera. An image is captured utilizing the $ALUM_{prev}$ and the $BRIGHT_{prev}$ as shown in block 64. The $ALUM_{prev}$ is calculated from the equation $ALUM_{prev}=RLUM_{prev}/(2 \exp TEV_{prev})$. The system then waits to capture the next image as shown in block 66. Finally, the control of the process flows to block 50 for capturing the next image. If the check performed at block 50 in the beginning of this method is evaluated and found to be true then a new image is captured with the camera as shown in block 64 and the process waits until it is time to capture the next image as shown in block 66. And the process control flows to the block 50 for repeating the entire process.

The software program utilizes the latitude and longitude coordinates to automatically adjust the rate of change of exposure in a period of twilight and tailors the time-lapse to a plurality of conditions at the latitude value. The software program automatically calculates the period of twilight brightness and adjusts for the correct rate of brightness change. The software program computes the sun angle from the local time and the latitude and longitude coordinates to ensure accuracy regardless of the latitude. Thus, for achieving a time-lapse with minimal flicker, the latitude and longitude information may be utilized not just in twilight scenes, but at other times as well.

The present invention may be further illustrated with an example. In this example, the electronic device is a computer. Here, the computer is set to a current time-of-day and a time zone at a particular location. A plurality of GPS coordinates (latitude 39.15°, longitude −129.15°) is entered into the flicker minimizing function. In this case the information is automatically detected and automatically entered. The shutter speed value is entered with a value of f/2.8. The camera sensitivity minimum value and the camera sensitivity maximum value are entered as 100 and 3200 respectively. Thereafter, the camera sensitivity shift time is entered as 20 seconds. Then, the minimum aperture value 0.5" and the maximum aperture value 30" are entered. Next, three ND filters are attached on the camera lens in an order from first to third having values of 3.23, 2.98 and 2.98 stops respectively.

A desired image luminance value of 110 is entered into the computer, where the luminance is a measure of the apparent brightness of the image. An initial aperture value of f/2.8, an initial camera sensitivity of 100 and an initial shutter speed value of 0.5" are entered to establish an initial image luminance near the desired luminance value. The time-lapse program is started at 5:50 PM with a sun elevation of 10.3 (above the horizon) at a time-lapse interval of 10 seconds between the images. As the sun sets and the scene darkens, the software program gradually increases the shutter speed to maintain the desired luminance. At 6:44 PM (sun at −0.4°) when the shutter speed has increased to 8.438", the operator removes the third ND filter (2.98 stops) thereby allowing the software program to reduce the shutter speed reciprocally to a value of 1.307". Here, the reciprocity of the filter and the darkening due to further setting of the sun is considered.

At 6:58 PM (sun at −2.8°) when the shutter speed has increased to 8.176", the operator removes the second ND filter (2.98 stops) thereby allowing the software program to reduce the shutter speed reciprocally to a value of 1.192". Here also, the reciprocity of the filter and the darkening due to further setting of the sun are considered. At 7:08 PM (sun at −4.7°) when the shutter speed has increased to 8.732", the operator removes the first ND filter (3.23 stops) thereby allowing the software program to reduce the shutter speed reciprocally to a value of 1.020". In this case also, the reciprocity of the filter and the darkening due to further setting of the sun are considered. At 7:23 PM (sun at −7.5°) when the shutter speed has increased to 20.863", the software program automatically increases the camera sensitivity to 200 and decreases the shutter speed to 12.216". Here, the reciprocity of the ISO change and the darkening due to further settings of the sun are considered.

At 7:27 PM (sun at −8.3°) when the shutter speed has increased to 22.394", the software program increases the camera sensitivity to 400 and decreases the Tv to 12.088" (considering the reciprocity of the camera sensitivity change and the darkening due to further setting of the sun). At 7:31 PM (sun at −9.2°) when the shutter speed has increased to 23.019", the software program increases the camera sensitivity to 800 and decreases the Tv to 12.411" (considering the reciprocity of the ISO change plus the darkening due to further setting of the sun).

At 7:36 PM (sun at −10.2°) when the shutter speed has increased to 23.653", the software program increases the camera sensitivity to 1600 and decreases the shutter speed to 12.670" (considering the reciprocity of the camera sensitivity change plus the darkening due to further setting of the sun). At 7:42 PM (sun at −11.2°) when the shutter speed has increased to 22.940", the software program increases the camera sensitivity to 3200 and decreases the shutter speed to 12.144" (considering the reciprocity of the ISO change and the darkening due to further setting of the sun). The software program automatically and gradually increases the shutter speed up to a is maximum value of 30" specified by the camera operator at 7:56 PM (sun at −14°). At 9:18 PM (sun at −29.3°) the operator terminates the software program. The software program smoothly and gradually adjusts the time-lapse interval from the initial 10 seconds to 33 seconds as the sun angle decreases over the range between 0° and −10°.

Figure 3:
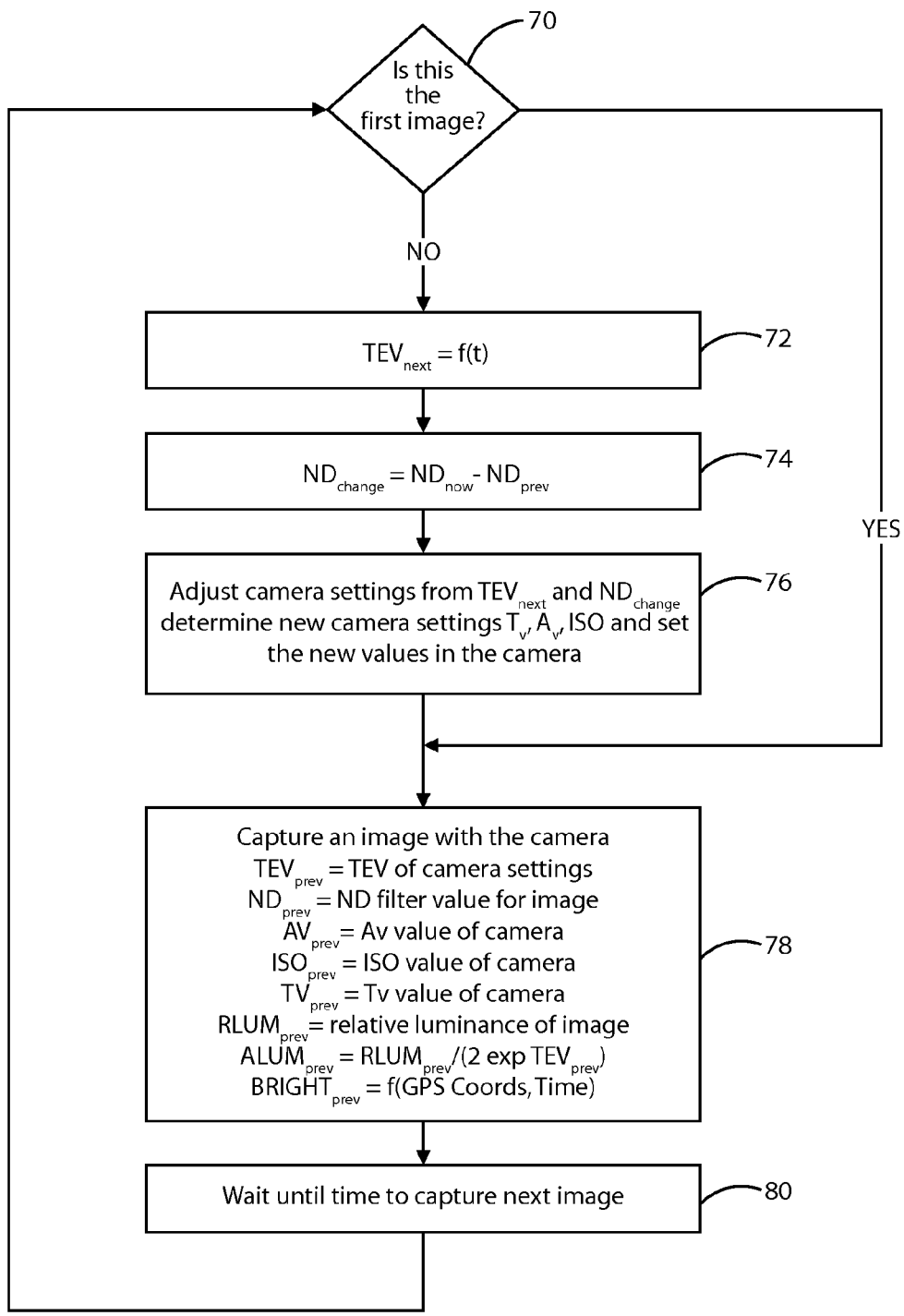
FIG. 3 is a flowchart illustrating a method for calculating the TEV utilizing a flicker minimizing function script of the present invention.

FIG. 3 is a flowchart illustrating a method for calculating the TEV by utilizing a flicker minimizing function script, f(t). The flicker minimizing function script specifies the TEV value as a function of time. Similar to the flowchart illustrated in FIG. 2, the TEV calculation method starts by performing a check to verify whether the camera is capturing the first image as shown in block 70. If the camera is not capturing the first image, the $TEV_{next}$ is calculated for the next image exposure utilizing the flicker minimizing function script f(t) 72. Then, a change in ND filter value ($ND_{change}$) is calculated by subtracting a previous ND value ($ND_{prev}$) from a current ND value ($ND_{now}$) as indicated at block 74. Finally, as shown in block 76, new values for the shutter speed, the sensitivity and the aperture are determined by utilizing the $TEV_{next}$ and the $ND_{change}$. The new values are set in the camera. An image is captured utilizing the $ALUM_{prev}$ and the $BRIGHT_{prev}$ as shown in block 78. The $ALUM_{prev}$ is calculated from the equation $ALUM_{prev} = RLUM_{prev}/(2 \exp TEV_{prev})$. The method waits to capture the next image as shown in block 80. Finally, the control of the process flows to the block 70 for capturing the next image. If the check performed at block 70 at the beginning of this method is found to be true then a new image is captured with the camera as shown in block 78 and the process waits until time to capture the next image as shown in block 80. And the process control flows to the block 70 for repeating the entire process.

Figure 4A:
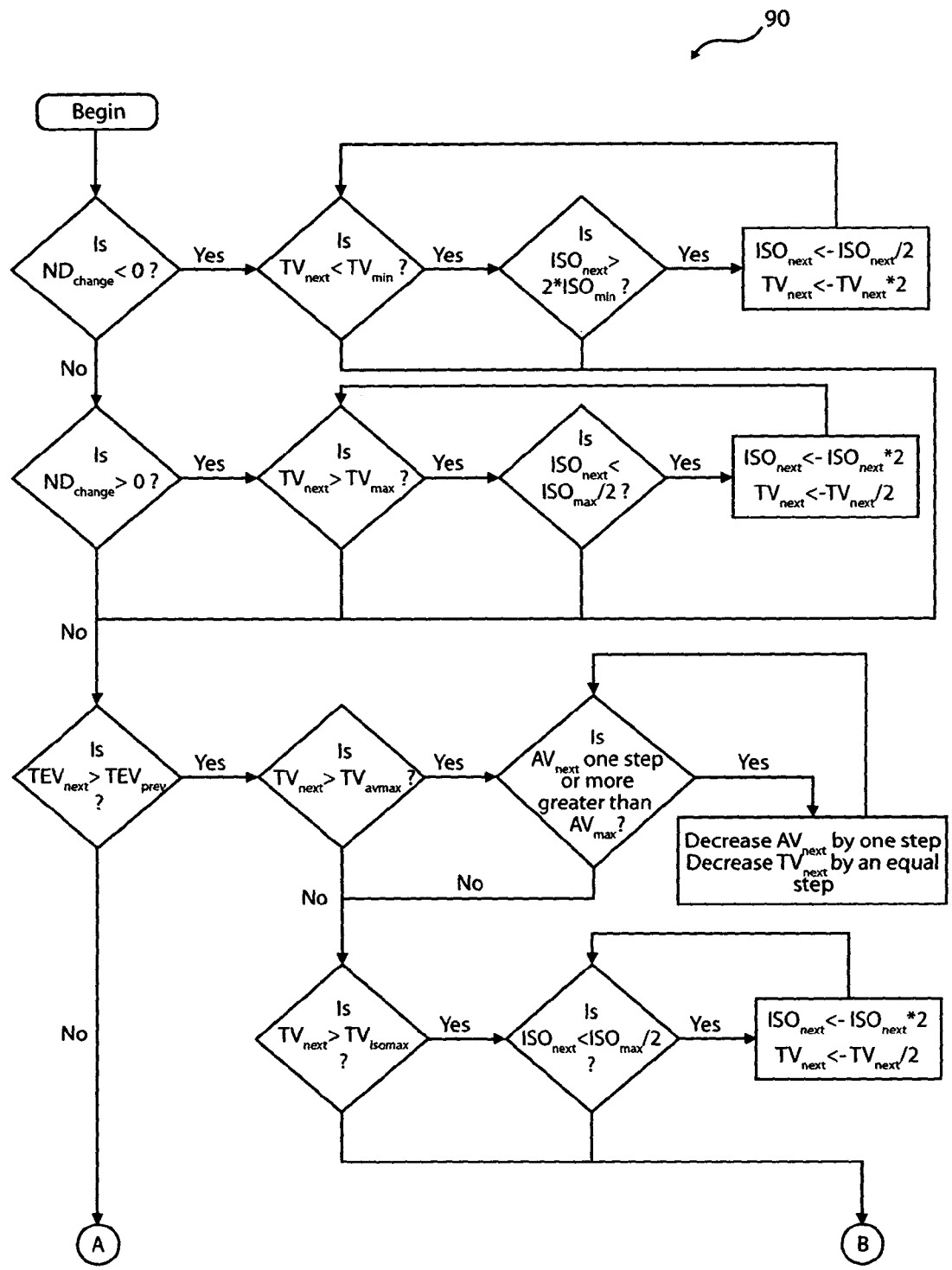
FIG. 4A is a partial flowchart illustrating a method for adjusting camera settings of the present invention.
Figure 4B:
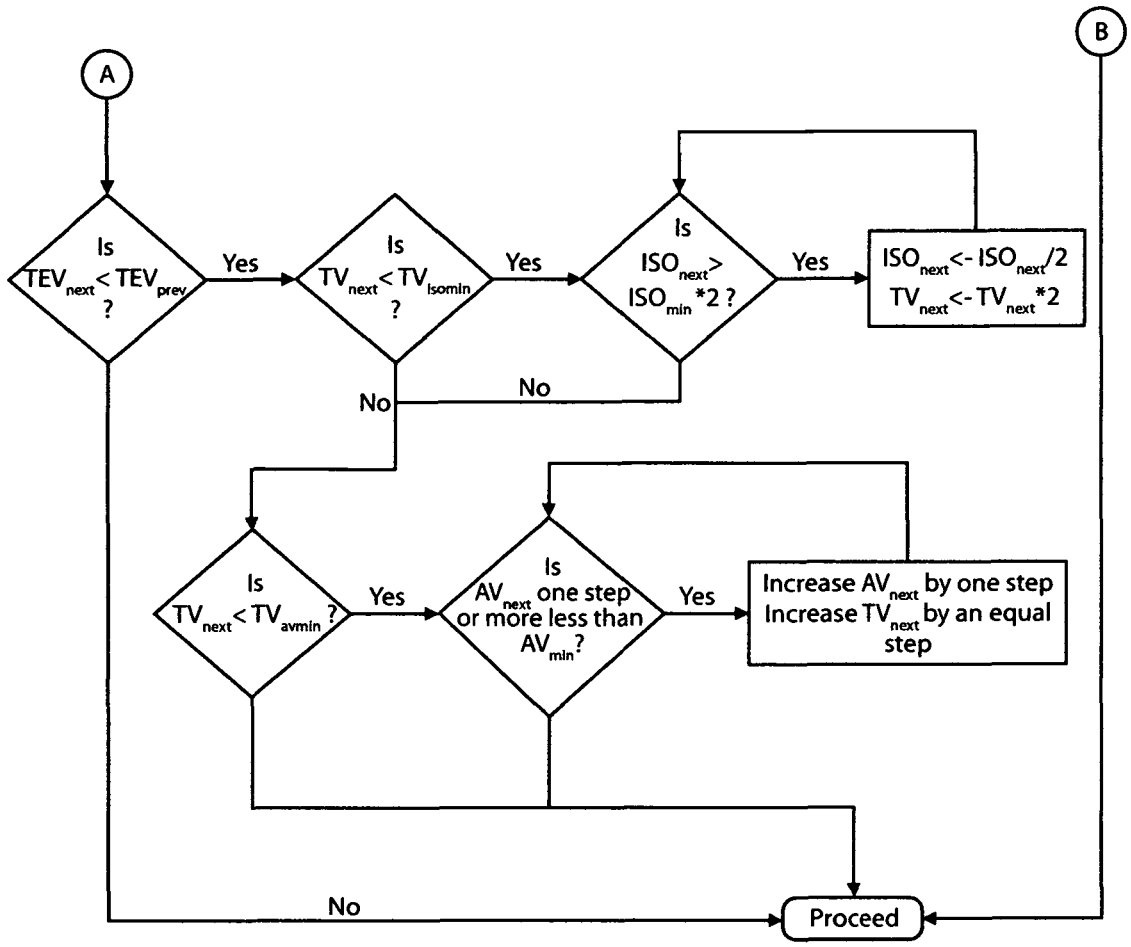
FIG. 4B is a partial flowchart illustrating a method for adjusting camera settings of the present invention.

FIG. 4 is a detailed flowchart 90 illustrating a method for adjusting the camera settings performed at block 62 and block 76 of FIG. 2 and FIG. 3 respectively. The flowchart 90 describes the detailed process for setting new values for the shutter speed, aperture and the ISO. It will be understood from the flowchart 90 that, the f-number decreases when the shutter speed increases to a maximum value of $TV_{avmax}$ and the f-number increases when the shutter speed decreases to a minimum value of $TV_{avmin}$. Similarly, the camera sensitivity increases when the shutter speed increases to a maximum value of $TV_{isomax}$ and the camera sensitivity decreases when the shutter speed decreases to a minimum value of $TV_{isomin}$.

Figure 5:
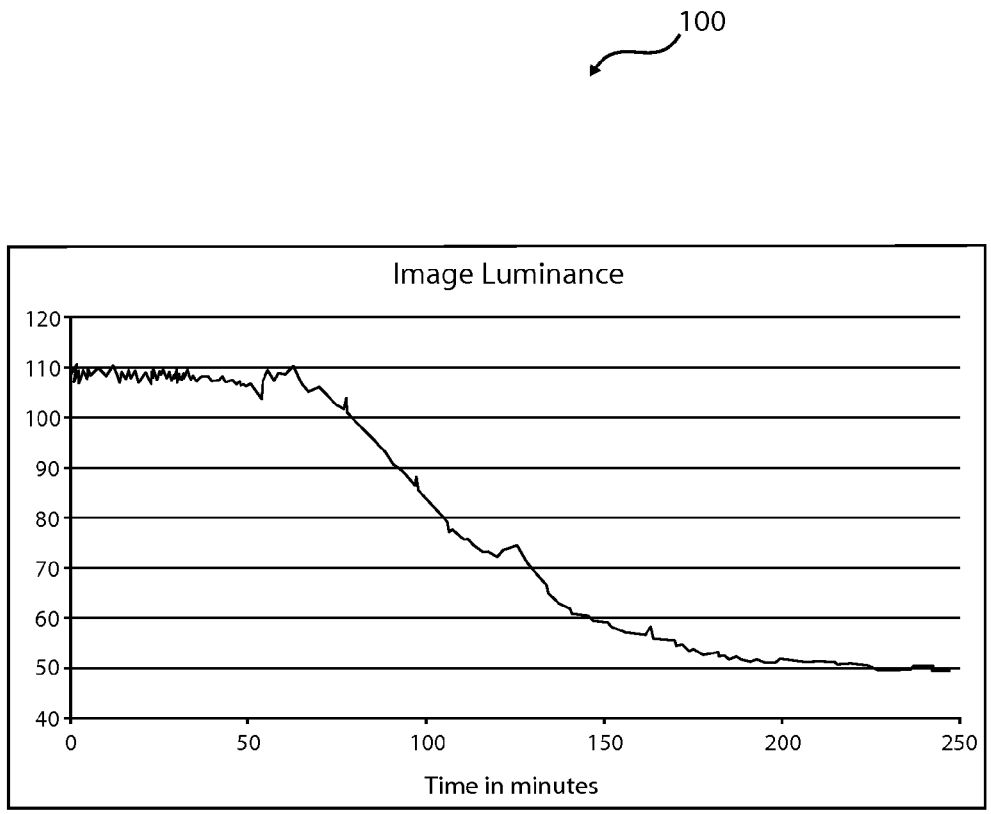
FIG. 5 is a graphical representation of an image luminance in the time-lapse photograph of the present invention.

FIG. 5 is a graphical representation 100 of an image luminance across a series of photographs taken at a time represented by the X-axis of the graph. In this graphical representation, there are some initial variations over the first half hour during the daylight when the bulb duration was nearer the camera's minimum. Most of the luminance variation is due to changes in the sky brightness caused by cloud cover, cloud illumination, passing boats, passing airplanes and the like. The resulting video has no significant flicker.

Figure 6:
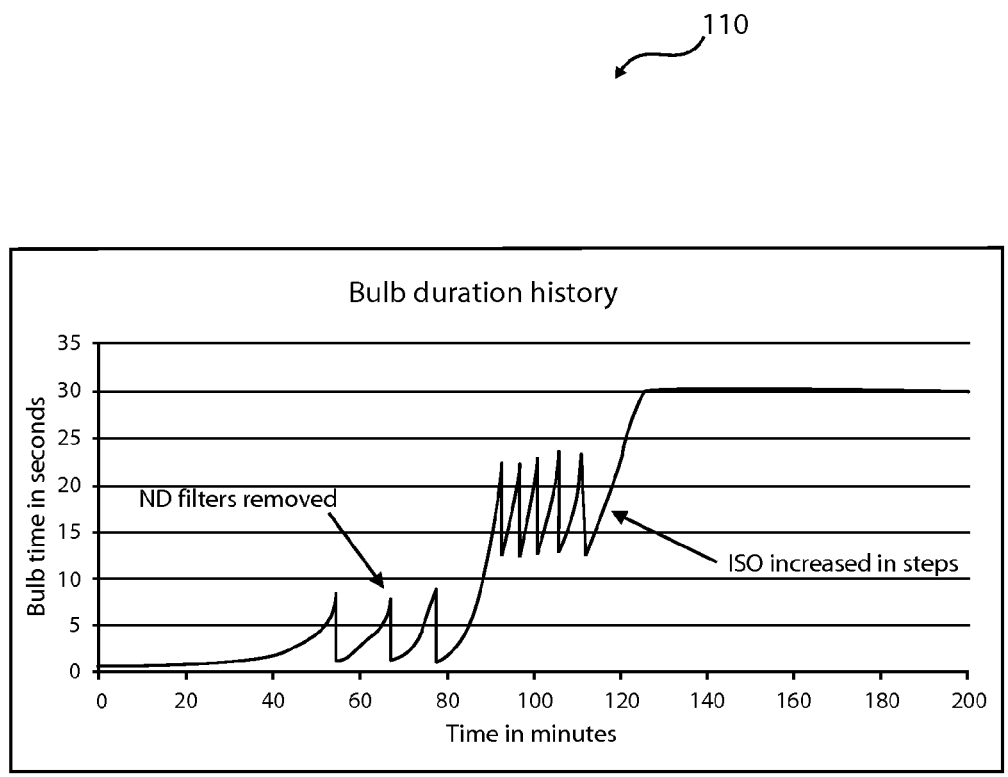
FIG. 6 is a graphical representation of a variation of bulb exposure time over a three-hour duration during a sunset time-lapse with the present invention.

FIG. 6 is a graphical representation 110 of a variation of a bulb exposure time over a three-hour duration during a sunset time-lapse. Here the flicker minimizing function adjusts the time-lapse interval between the images to make a smooth transition from 10 seconds during the daylight to 33 seconds at night.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for generating a sequence of time-lapse photographs, the method comprising the steps of:
   a. entering a time-of-day value into a software program installed on an electronic device;
   b. entering latitude and longitude coordinates into the software program;
   c. entering a camera sensitivity minimum value, a camera sensitivity maximum value and a camera sensitivity shift time;
   d. entering a minimum shutter speed value and a maximum shutter speed value;
   e. installing on a camera lens at least one neutral density filter having a stop value;
   f. entering a desired image luminance value into the electronic device;
   g. entering a camera aperture value, a camera sensitivity value and a camera shutter speed value to establish an initial image luminance near the desired image luminance value;
   h. executing the software program to control a camera to capture a plurality of images having a time-lapse interval between said images;
   i. gradually increasing the camera shutter speed value to maintain said desired image luminance;
   j. incrementally increasing the camera sensitivity value when the camera shutter speed value increases beyond the camera sensitivity shift time;
   k. causing a corresponding reciprocal change in the camera shutter speed value whenever the camera sensitivity value changes incrementally;
   l. removing the at least one neutral density filter each time the camera shutter speed value increases sufficiently to allow the software program to reduce the camera shutter speed value reciprocally and maintain a value greater than a minimum bulb time of the camera;
   m. automatically and gradually increasing the camera shutter speed value by the software program to maintain the desired image luminance when the camera sensitivity value has not attained a maximum value;
   n. incrementally increasing the camera sensitivity value whenever the camera shutter speed value increases beyond the camera sensitivity shift time and making a corresponding reciprocal change by the software program in the camera shutter speed value whenever the camera sensitivity value is incrementally changed;

o. repeating steps from (m) through (n) a plurality of times; and p. automatically and gradually increasing the camera shutter speed value by the software program up to a maximum value specified by the camera operator.

2. The method of claim 1 further comprising:
   a. entering an aperture minimum lens f-number value, an aperture maximum lens f-number value and an aperture value shift time into the software program;
   b. incrementally decreasing the camera aperture value when the camera shutter speed value increases beyond the aperture value shift time; and
   c. causing a corresponding reciprocal change in the camera shutter speed value by whenever the camera aperture value or the camera sensitivity value changes incrementally.

3. The method of claim 1 wherein the desired image luminance value is a measure of the apparent brightness of an image.

4. The method of claim 1 wherein the minimum shutter speed value is longer than a minimum bulb time of a camera and the maximum shutter speed value is short enough to allow for a practical time-lapse interval.

5. The method of claim 4 wherein the minimum bulb time of the camera is greater than 0.1 seconds and less than 30 seconds.

6. The method of claim 1 wherein the electronic device is selected from a group consisting of a camera, a computer, or a mobile phone.

7. The method of claim 1 wherein the software program calculates a total exposure value (TEV) for setting new values for the camera shutter speed value, the camera sensitivity value and the camera aperture value for capturing a new image.

8. The method of claim 7 wherein the calculation of the TEV is accomplished by:
   a. performing a check to verify whether the camera is capturing a first image;
   b. calculating a current brightness ($BRIGHT_{now}$) based on the latitude and longitude coordinates and the time-of-day value if the camera is not capturing the first image;
   c. calculating a predicted change in brightness ($BRIGHT_{delta}$) by subtracting a previous brightness ($BRIGHT_{prev}$) from the $BRIGHT_{now}$;
   d. calculating a predicted absolute luminance ($ALUM_{pred}$) utilizing a previous absolute luminance ($ALUM_{prev}$) and the $BRIGHT_{delta}$;
   e. calculating a $TEV_{next}$ to use for the next image exposure utilizing a relative luminance desired by the camera operator ($RLUM_{desired}$) and the $ALUM_{pred}$;
   f. calculating a change in ND filter value ($ND_{change}$) by subtracting a previous ND value ($ND_{prev}$) from a current ND value ($ND_{now}$);
   g. determining new values for the camera shutter speed value, the camera sensitivity value and the camera aperture value by utilizing the $TEV_{next}$ and the $ND_{change}$;
   h. setting the new values in the camera;
   i. capturing an image utilizing the $ALUM_{prev}$ and the $BRIGHT_{prev}$;
   j. waiting until the time to capture a next image; and
   k. repeating steps (a) through (j) a plurality of times.

9. The method of claim 8 wherein the $BRIGHT_{now}$ is a relative brightness of the sky on a logarithmic base 2 scale.

10. The method of claim 8 wherein the $RLUM_{desired}$ is a relative luminance value desired by the camera operator.

11. The method of claim 7 wherein the TEV denotes a combined exposure value of the aperture, the shutter speed, the sensitivity and the ND filter.

12. The method of claim 1 wherein the software program utilizes the latitude and longitude coordinates to automatically adjust a rate of change of exposure in a period of twilight.

13. The method of claim 1 wherein the software program automatically calculates a period of twilight brightness and adjusts the correct rate of brightness change.

14. A method for generating a sequence of time-lapse photographs, the method comprising the steps of:
   a. entering a time-of-day value into a software program installed on an electronic device;
   b. entering latitude and longitude coordinates into the software program;
   c. entering a camera sensitivity minimum value, a camera sensitivity maximum value and a camera sensitivity shift time;
   d. entering a minimum shutter speed value and a maximum shutter speed value, the minimum shutter speed value being longer than a minimum bulb time of a camera and the maximum shutter speed value being short enough to allow for a practical time-lapse interval;
   e. installing on a camera lens at least one neutral density filter;
   f. entering a desired image luminance value, the desired image luminance value being a measure of the apparent brightness of the image;
   g. entering a camera aperture value, a camera sensitivity value and a camera shutter speed value to establish an initial image luminance value near the desired image luminance value;
   h. executing the software program to control the camera to capture a plurality of images having a time-lapse interval between said images;
   i. gradually increasing the camera shutter speed value to maintain the desired image luminance value during a sunset;
   j. incrementally increasing the camera sensitivity value when the camera shutter speed value increases beyond the camera sensitivity shift time;
   k. causing a corresponding reciprocal change in the camera shutter speed value whenever the camera sensitivity value changes;
   l. removing at least one neutral density filter each time the camera shutter speed value increases sufficiently to allow the software program to reduce the camera shutter speed value reciprocally and maintain a value greater than the minimum bulb time of the camera;
   m. automatically and gradually increasing the camera shutter speed value when the camera sensitivity value has not attained a maximum value;
   n. incrementally increasing the camera sensitivity value whenever the camera shutter speed value increases beyond the camera sensitivity shift time and making a corresponding reciprocal change in the camera shutter speed value whenever the camera sensitivity value is incrementally changed;
   o. repeating steps (m) through (n) a plurality of times; and
   p. automatically and gradually increasing the camera shutter speed value up to a maximum value specified by the camera operator.

15. The method of claim 14 wherein the software program calculates a total exposure value (TEV) for setting new values for the camera shutter speed value, the camera sensitivity value and the camera aperture value for capturing a new image.

16. The method of claim 15 wherein the calculation of the TEV is accomplished by:
   a. performing a check to verify whether the camera is capturing a first image;
   b. calculating a current brightness ($BRIGHT_{now}$) based on the latitude and longitude coordinates and the time-of-day value if the camera is not capturing the first image;
   c. calculating a predicted change in brightness ($BRIGHT_{delta}$) by subtracting a previous brightness ($BRIGHT_{prev}$) from the $BRIGHT_{now}$;
   d. calculating a predicted absolute luminance ($ALUM_{pred}$) utilizing a previous absolute luminance ($ALUM_{prev}$) and the $BRIGHT_{delta}$;
   e. calculating a $TEV_{next}$ to use for a next image exposure utilizing a relative luminance desired by the camera operator ($RLUM_{desired}$) and the $ALUM_{pred}$;
   f. calculating a change in ND filter value ($ND_{change}$) by subtracting a previous ND value ($ND_{prev}$) from a current ND value ($ND_{now}$);
   g. determining new values for the camera shutter speed value, the camera sensitivity value and the camera aperture value by utilizing the $TEV_{next}$ and the $ND_{change}$;
   h. setting the new values in the camera;
   i. capturing an image utilizing the $ALUM_{prev}$ and the $BRIGHT_{prev}$;
   j. waiting a time to capture the next image; and
   k. repeating steps (a) through (j) a plurality of times.

17. The method of claim 16 wherein the $RLUM_{desired}$ is a relative luminance value desired by the camera operator.

18. The method of claim 14 wherein the software program automatically calculates a period of twilight brightness and adjusts for a correct rate of brightness change.

19. The method of claim 14 wherein the software program utilizes the latitude and longitude coordinates to automatically adjust a rate of change of exposure in a period of twilight.

20. The method of claim 14 wherein the minimum bulb time of the camera is preferably greater than 0.1 seconds and the practical time-lapse interval is preferably less than 30 seconds.

21. The method of claim 14 further comprising:
   a. entering aperture information into the software program;
   b. entering an aperture minimum lens f-number value, an aperture maximum lens f-number value and an aperture shift time into the software program, the aperture shift time being the camera shutter speed value above which the software program decreases the aperture f-number;
   c. incrementally decreasing the camera aperture value when the camera shutter speed value increases beyond the aperture shift time; and
   d. causing a corresponding reciprocal change in the camera shutter speed value whenever the camera aperture value or the camera sensitivity value changes.

22. A method for generating a series of time-lapse photographs utilizing a software program adaptable to minimize flickering of an image sequence, the method comprising the steps of:
   a. entering a time-of-day value into a software program installed on an electronic device;
   b. entering a total exposure value (TEV) script, said TEV script in the form of a curve, a table or a mathematical function, wherein the TEV script denotes a combined exposure value derived from an aperture value, a shutter speed value, a sensitivity value, and a neutral density filter value, and wherein the TEV script specifies how a camera total exposure value (CTEV) changes as a function of time;
   c. entering a camera sensitivity minimum value, a camera sensitivity maximum value and a camera sensitivity shift time;
   d. entering a minimum shutter speed value and a maximum shutter speed value, the minimum shutter speed value being longer than a minimum bulb time of a camera and the maximum shutter speed value being short enough to allow for a practical time-lapse interval;
   e. installing at least one neutral density filter on a camera lens;
   f. entering an initial camera aperture value, an initial camera sensitivity value and an initial camera shutter speed value;
   g. executing the software program to control the camera to capture a plurality of images having a time-lapse interval between said images;
   h. gradually increasing the camera shutter speed value to maintain the CTEV as specified by the TEV script;
   i. incrementally increasing the camera sensitivity value when the camera shutter speed value increases beyond the camera sensitivity shift time;
   j. causing a corresponding reciprocal change in the camera shutter speed value whenever the camera sensitivity value changes incrementally;
   k. removing the at least one neutral density filter each time the camera shutter speed value increases sufficiently to allow the software program to reduce either the camera shutter speed value or camera sensitivity value reciprocally while maintaining a shutter speed value greater than the minimum bulb time of the camera;
   l. automatically and gradually increasing the camera shutter speed value to maintain the camera CTEV as specified by the TEV script when the camera sensitivity has not attained a maximum value;
   m. incrementally increasing the camera sensitivity value whenever the camera shutter speed value increases beyond the camera sensitivity shift time and making a corresponding reciprocal change to the camera shutter speed value whenever the camera sensitivity value is incrementally changed; and
   n. repeating steps (l) through (m) a plurality of times; and
   o. automatically and gradually increasing the shutter speed to maintain the CTEV value as specified by the TEV script up to a maximum value specified by the camera operator.

23. The method of claim 22 wherein the minimum bulb time of the camera is preferably greater than 0.1 seconds and the practical time-lapse interval is preferably less than 30 seconds.

24. The method of claim 22 further comprising:
   a. entering aperture information into the software program;
   b. entering an aperture minimum lens f-number value, an aperture maximum lens f-number value and an aperture shift time into the electronic device, the aperture shift time being a shutter speed value above which the software program decreases the aperture f-number;
   c. incrementally decreasing the aperture value when the shutter speed increases beyond the aperture shift time; and
   d. causing a corresponding reciprocal change in the shutter speed value whenever the aperture value or the camera sensitivity changes incrementally.

* * * * *